US006310939B1

(12) United States Patent
Varney

(10) Patent No.: US 6,310,939 B1
(45) Date of Patent: Oct. 30, 2001

(54) METHOD AND APPARATUS FOR SCREENING A CALL AS THE CALL IS TRANSMITTED TO VOICE MAIL

(75) Inventor: Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/134,267

(22) Filed: Aug. 14, 1998

(51) Int. Cl.[7] ........................................................ H04M 1/64
(52) U.S. Cl. ...................... 379/88.01; 379/88.26; 379/212.01
(58) Field of Search ................................ 379/258, 35, 80, 379/82, 210, 211, 230, 235, 34, 88.01, 88.02, 88.03, 88.04

(56) References Cited

U.S. PATENT DOCUMENTS

| | | | |
|---|---|---|---|
| 5,471,519 | * 11/1995 | Howe et al. | 379/67 |
| 5,471,579 | 11/1995 | Howe et al. . | |
| 5,572,583 | * 11/1996 | Wheeler, Jr. et al. | 379/207 |
| 5,651,054 | * 7/1997 | Dunn et al. | 379/67 |
| 5,771,273 | * 6/1998 | McAllister et al. | 379/67 |
| 5,963,620 | * 10/1999 | Frankel et al. | 379/93.05 |
| 6,028,924 | * 2/2000 | Ram et al. | 379/229 |

OTHER PUBLICATIONS

European Search Report EP 99 30 6119, Varney, D.W. Mar. 9, 2000.
European Patent Application 0 688 126 A2, Pub date: Dec. 20, 1995, Fenner.
"Call Screening FSD 01–02–2100, A Module of LSSGR, FR–NWT–000064", Bellcore, Generic Requirements, GR–1512–Core, Issue, 2, Oct., 1994, 34 page Generic Requirements.*

* cited by examiner

Primary Examiner—Fan Tsang
Assistant Examiner—Nora J. Putt
(74) Attorney, Agent, or Firm—Jack R. Penrod

(57) ABSTRACT

A screening and monitoring capability for switch based voice messaging systems that allows a called party to hear the caller and the caller's voice as the caller leaves a message and break in to start a normal telephone discussion if the caller or the caller's subject warrants such action. The method and apparatus of this invention provide for an advanced intelligent network service feature that controls the bridging of the connections to the voice mail and the called party's telephone station. The service feature turns the voice mail off and tears down the connection if the monitoring called party speaks.

9 Claims, 2 Drawing Sheets

METHOD AND APPARATUS FOR SCREENING A CALL AS THE CALL IS TRANSMITTED TO VOICE MAIL

TECHNICAL FIELD

The invention relates generally to voice mail, and more particularly to a method and apparatus for screening messages as they are being transmitted for storage in a switch based voice mail system.

DESCRIPTION OF THE PRIOR ART

As switch based voice mail services have evolved, there is one very advantageous service that customer premises equipment answering machines provide that switch based voice mail has lacked, namely the ability to listen and/or screen a call as a caller stores a message on the storage media. By listening and/or screening an incoming call, the called party has the option of interjecting himself or herself into the call at any time as a message is being stored and talking to the calling party immediately if it concerns a matter upon which the called party wishes to immediately discuss. This is most useful when family, friends or co-workers are traveling and they call from an unfamiliar number, such calls cannot be filtered for special attention by their ICLIDs so if the called party is busy, calls that the called party would typically answer are instead passed to the voice mail system and delayed.

A switch based voice mail screening service capability has been specified generically in BellCore Call Screening Capability GR-1512-Core. But an actual embodiment of such a switch based service is not presently available.

Thus, there is a long felt need in the art for a switch based method and apparatus for screening voice mail as the voice mail message is transmitted by the calling party to the storage medium. Furthermore, there is a long felt need for switch based method and apparatus for screening voice mail with a capability for interjection by the called party by listening and/or speaking to the calling party instead of leaving the calling party to transmit a message to the switch based voice mail system that will be heard and responded to later.

SUMMARY OF THE INVENTION

Briefly stated in accordance with one aspect of the invention the aforementioned needs are fulfilled and a technical advance is achieved by providing a voice mail screening service using an advanced intelligent network (AIN) including a service node connected as a bridging point between a calling party, voice mail system, and called subscriber. AIN service switching point (SSP) Service Control Point (SCP) is used to route the calls to the appropriate location for screening as the calling party transmits a message. If the called party is a subscriber to switch based voice mail with screening and interjecting capabilities, the called party screens the call as the calling party transmits information to the switch based voice mail system. Further, the AIN service switching point (SSP) Service Control Point (SCP) is used to change the call characteristics, such as dialed number, calling number and redirecting number to work transparently with existing voice mail systems.

DETAILED DESCRIPTION

Figure 1:
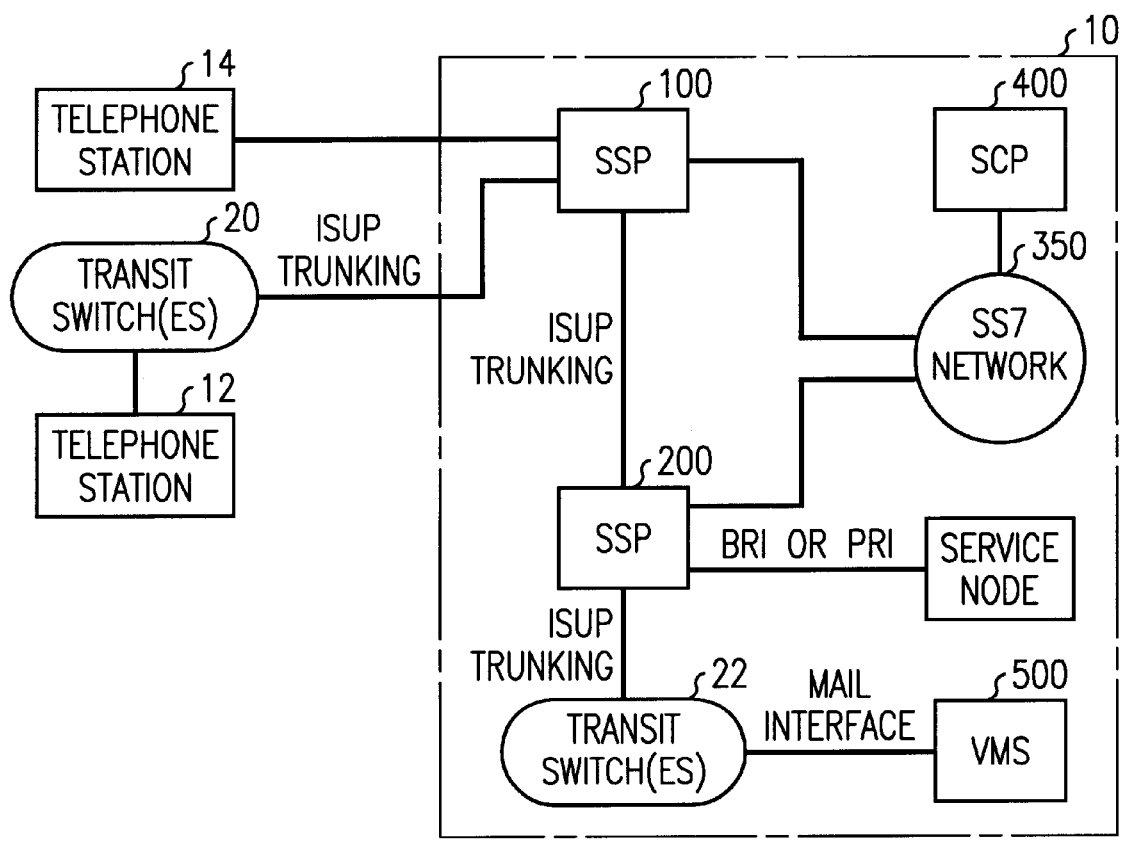
FIG. 1 is a simplified block diagram illustrating an arrangement for a system for call screening of voice mail.
Figure 2:
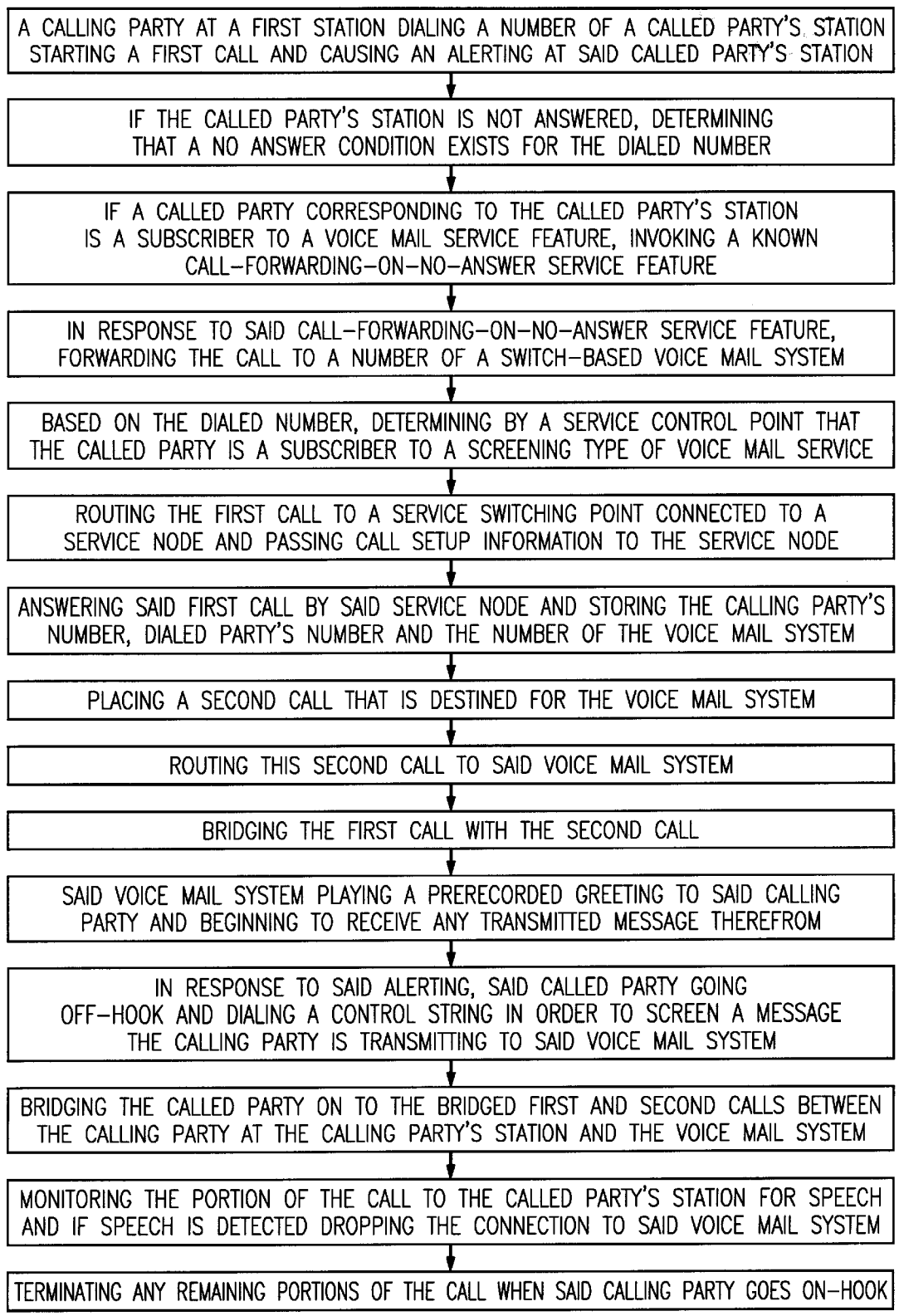
FIG. 2 is a call flow diagram.

Referring to FIG. 1, an arrangement 10 for a voice mail screening service feature is shown. The arrangement 10 has SSP 100. SSP 100 is connected to calling party's station 12 through one or more transit switches 20, i.e. a public switched telephone network. SSP 100 is connected to called party's station 14 and via SSP 200 and transit switches 22 to switch based voice mail system (VMS) 500 to which the called party subscribes.

SSPs 100, 200 and Transit Switches 20, 22 are preferrably connected using ISDN User Part (ISUP) Trunks. It is worth noting that SP 100 and SSP 200 may be the same unit, in which case the ISUP trunk shown between SSP 100 and SSP 200 is not necessary and only one link to SS7 network 350, instead of the two shown in FIG. 1. A service node (SN) 300 is connected to SSP 200 using either a PRI or a BRI interface. VMS 500 is connected to transit switch(es) 22 using as its physical connection a standard voice mail interface such as SMDI, but it could also be another interface such as a PRI or an ISUP interface.

In operation, a calling party at station 12 dials the number of called party's station 14. The network of transit switches 20 routes this call to the called party's switching system 10 causing the called party's station 14 to ring. If the called party does not answer, switching system 10 detects a no answer condition and invokes an existing switch feature, Call Forwarding on No Answer. The call is forwarded to the number of VMS 500. The number of VMS 500 has been provisioned with an AIN Dialed Number Trigger (DNT) in the switching system 10. Due to this trigger, an AIN SS7 query (i.e. Info Analyze Message) is made to SCP 400. This query passes, along with other information as specified in BellCore GR-1298, the calling party line number, the calling party's number, and the call forwarded number. Based on called party's number, SCP 400 determines that the called party is a subscriber to voice mail screening service. The SCP 400 returns an Analyze Route Message to the SSP 100 indicating that this call will be routed to Service Node (SN) 300. The SSP 100 routes the call to SSP 200 of SN 300 and passes call setup information over the D-Channel to the SN 300. The SN 300 answers the call and stores the calling party's number, called party's number and the number of VMS 500.

Next, SN 300 places a call destined for the VMS 500. In the Setup message of the call to VMS 500 SN 300 specifies the calling party with the number of the calling party's station 12, the original called party with the number of the called party's station 14, and the called party with the number of the VMS 500. SSP 200 routes this call to VMS 500, which in the example of FIG. 1 crosses transit switches 22, to VMS 500. Then, SN 300 bridges the call from the calling party at station 12 with the call to the VMS 500. The VMS 500 plays the subscriber greeting and begins collecting the message from the calling party.

The called party, who is a subscriber to the voice mail message screening service feature, if he or she desires to listen to the calling party leaving a message, goes off hook and dials a string, such as *xx, yyyxxxx, etc. This string has been provisioned with a trigger (Public Office Dialing Plan Trigger or DNT based on the format of the number) in the SSP 100. This causes an AIN SS7 query (InfoAnalyze Message) to be transmitted to the SCP 400. The SCP 400 returns the number of the SN 300 as the routing number in an Analyze Info Message response to the query. The SSPs 100, 200 route the call to the SN 300. The SN 300 answers the call, correlates the called party's number with the previous call between the calling party at station 12 and the VMS 500. Next, the SN 300 bridges the called party on to the call between the calling party at station 12 and the voice mail system 500. While the calls are bridged, the SN 300 monitors the called party's leg of the call for spoken word. If the called party speaks, the SN 300 detects it and drops the connection to the voice mail system 500. Next, the SN 300 signals to the SSP 200 to bridge the call in the switch using a switch capability like the 2 B-Channel Transfer Feature.

If, on the other hand, the called party at station 14 chooses not to screen the call, SN 300 detects when the calling party at station 12 or VMS 500 terminates their leg of the call and tears down the other leg of the call. This ends the call initiated by the calling party at station 12.

Variations

In another embodiment of the invention, the number used for call forwarding is the service node number instead of the voice mail number. In such a case, the information delivered to SN 300 does not include the number of the voice mail system, therefore the following steps are taken when SN 300 places the call destined for the voice mail system 500: The SN 300 places a call the call for the voice mail leg. A trigger in the SSP 200 such as a B-Channel Setup causes an AIN SS7 Info Collected Message to be sent to SCP 400. Based on the calling party ID parameter which contains the called party's (subscriber's) number, SCP 400 determines the VMS 500 number and returns an Analyze Information response that includes routing information to the VMS 500.

In yet another embodiment of the invention, after the called party subscriber at station 14 has decided to take the call, SN 300 and VMS 500 can communicate using a protocol such as OCL to remove from VMS 500 any partial message left by the calling party.

In yet another embodiment, after the calling party at station 12 has started to leave a message on VMS 500, SN 300 can place a call to the called party subscriber at station 14 with a special ringing pattern, e.g. a "ping ring", to indicate that the transmission of a message to VMS 500 is in progress. In such a case if the called party subscriber at station 14 lifts the handset off-hook, then SN 300 directly bridges the called party subscriber at station 14 into the call in screening mode.

In yet another embodiment, SCP 400 determines whether the calling party has finished leaving a message by the use of a Termination message when routing the call to SN 300. If the called party subscriber at station 14 attempts to screen a call to voice mail that has already been completed then the calling party subscriber at station 14 is routed to an announcement indicating the completion of the previous call.

In yet another embodiment of the invention, SCP 400 has the capability to route to multiple service nodes, i.e. SN 300 and others (not shown). SCP 400 maintains state on which SN the call from the calling party is routed to and routes the screening call from the called party subscriber to the proper SN.

Thus, it will now be understood that there has been described a new method and apparatus for screening a call as it is transmitted to a switch based voice mail system with the option of the called party to cease screening and begin conversing with the calling party of the call. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method for providing a call screening service feature comprising the steps of:

a calling party at a first station dialing a number of a called party's station starting a first call and causing an alerting at said called party's station;

if the called party's station is not answered, determining that a no answer condition exists for the dialed number;

if a called party corresponding to the called party's station is a subscriber to a voice mail service feature, invoking a known call-forwarding-on-no- answer service feature;

in response to said call-forwarding-on- no-answer service feature, forwarding the first call to a number of a switch based voice mail system;

based on the dialed number, determining by a service control point that the called party is a subscriber to a screening type of voice mail service;

routing the first call to a service switching point connected to a service node and passing call setup information of the first call to the service node;

answering said first call by said service node and storing the calling party's number, dialed party's number and the number of the voice mail system;

placing a second call that is destined for the voice mail system;

routing this second call to said voice mail system;

bridging the first call with the second call;

said voice mail system playing a prerecorded greeting to said calling party and beginning to receive any transmitted message therefrom;

in response to said alerting, said called party going off-hook and dialing a control string in order to screen a message the calling party is transmitting to said voice mail system;

bridging the called party on to the bridged first and second calls between the calling party at calling party's station and the voice mail system by using a 2 B-Channel Transfer Feature switch capability;

monitoring the portion of bridged first call and second call to the called party's station for speech and if speech is detected dropping from said bridged first call and second call the connection to said voice mail system; and terminating any remaining portions of the bridged first call and second call when said calling party goes on-hook.

2. The method of claim 1, wherein said control string has been provisioned with a trigger for a service switching point, which causes an advanced intelligent network SS7 query to be transmitted to a service control point, said service control point returns a number designating said service node as the routing number in a response to the query so when said service switching points route the first call to the service node which answers the first call, correlates the dialed number with the first call between the calling party and the voice mail system and said service node performs the bridging to said called party for screening.

3. A method for providing a call screening service feature comprising the steps of:

a calling party at a first station dialing a number of a called party's station starting a first call and causing an alerting at said called party's station;

if the called party's station is not answered, determining that a no answer condition exists for the dialed number;

if a called party corresponding to the called party's station is a subscriber to a voice mail service feature, invoking a known call-forwarding-on-no- answer service feature;

in response to said call-forwarding-on- no-answer service feature, forwarding the first call to a number of a switch based voice mail system;

based on the dialed number, determining by a service control point that the called party is a subscriber to a screening type of voice mail;

routing the first call to a service switching point connected to a service node and passing call setup information to the service node;

answering the first said call by said service node and storing the calling party's number, dialed party's number and the number of the voice mail system;

placing, by said service node, a second call that is destined for the voice mail system;

routing, by said service switching point, this second call to said voice mail system;

bridging, by said service node, the call from the first calling party with the second call to said voice mail system;

said voice mail system playing a prerecorded greeting to said calling party and beginning to receive any transmitted message therefrom;

said called party going off-hook and dialing a control string in order to screen a message the calling party is transmitting to said voice mail system;

bridging, by said service node, the called party bridged first and second call after on to the on to the call between the calling party at calling party's station and the voice mail system by using a 2 B-Channel Transfer Feature switch capability;

said service node monitoring an output of the called party's station for speech and if speech is detected dropping the second call portion of the bridged first call and second call to said voice mail system; and terminating any remaining portions of bridges first the call when said calling party goes on-hook.

4. The method of claim 3, wherein said control string has been provisioned with a trigger for a service switching point, which causes an advanced intelligent network SS7 query to be transmitted to a service control point, said service control point returns a number designating said service node as the routing number in a response to the query so when said service switching points route the first call to the service node which answers the first call, correlates the dialed number with the first call between the calling party and the voice mail system and said service node performs the bridging to said called party for screening.

5. The method of claim 3, further comprising the step of:
if the called party chooses not to screen the call, detecting when said calling party and said voice mail system terminate the call; and
in response to said termination of the call, tearing down the call.

6. The method of claim 3, wherein said service node signals to said the service switching point to bridge the call using a 2 B-Channel Transfer Feature switch capability.

7. A method for providing a call screening service feature comprising the steps of:
a calling party at a first station dialing a number of a called party's station starting a first call and causing an alerting at said called party's station;
if the called party's station is not answered, determining that a no answer condition exists for the dialed number;

if a called party corresponding to the called party's station is a subscriber to a voice mail service feature, invoking a known call-forwarding-on-no- answer service feature;

in response to said call-forwarding-on- no-answer service feature, forwarding the first call to a number of a switch based voice mail system;

based on the dialed number, determining by a service control point that the called party is a subscriber to a screening type of voice mail;

routing the first call to a service switching point connected to a service node and passing call setup information of the first call to the service node;

answering the first call by said service node and storing the calling party's number, dialed party's number and the number of the voice mail system;

placing, by said service node, a second call that is destined for the voice mail system;

routing, by said service switching point, this second call to said voice mail system;

bridging, by said service node, the call from the calling party with the second call to said voice mail system;

said voice mail system playing a prerecorded greeting to said calling party and beginning to receive any transmitted message therefrom;

said called party going off-hook and dialing a control string in order to screen a message the calling party is transmitting to said voice mail system;

bridging, by said service node, the bridged first call and second called party on to the call between the calling party at calling party's station and the voice mail system;

said service node monitoring the portion of the bridged first call and second call to the called party's station for any speech and if any speech is detected from the called party's station said service node dropping a portion of the second call to said voice mail system while maintaining a portion of the bridged the first call and second call from the calling party to the called party;

terminating any remaining portions of the the call when said calling party goes on hook; and said service node signaling to said service switching point to bridge the calling and called parties using a 2 B-Channel Transfer Feature switch capability.

8. The method of claim 7, wherein said control string has been provisioned with a trigger for a service switching point, which causes an advanced intelligent network SS7 query to be transmitted to a service control point, said service control point returns a number designating said service node as the routing number in a response to the query so when said service switching points route the first call to the service node which answers the first call, correlates the dialed number with the first call between the first calling party and the voice mail system and said service node performs the bridging to said called party for screening.

9. The method of claim 7, further comprising the step of:
if the called party chooses not to screen the bridged first call and second call, detecting when said calling party and said voice mail system terminate the bridged first call and second call; and
in response to said termination of the bridged first call and second call, tearing down the bridged first call and second call.

* * * * *